(12) United States Patent
Stallone et al.

(10) Patent No.: US 12,025,595 B2
(45) Date of Patent: Jul. 2, 2024

(54) THERMAL MODULATOR

(71) Applicant: LECO Corporation, St. Joseph, MI (US)

(72) Inventors: Gaetano Stallone, Bari (IT); Mark Firmer Merrick, Bridgman, MI (US)

(73) Assignee: LECO Corporation, St. Joseph, MI (US)

( * ) Notice: Subject to any disclaimer, the term of this patent is extended or adjusted under 35 U.S.C. 154(b) by 580 days.

(21) Appl. No.: 17/281,929

(22) PCT Filed: Oct. 4, 2019

(86) PCT No.: PCT/US2019/054618
§ 371 (c)(1),
(2) Date: Mar. 31, 2021

(87) PCT Pub. No.: WO2020/072855
PCT Pub. Date: Apr. 9, 2020

(65) Prior Publication Data
US 2021/0382017 A1    Dec. 9, 2021

Related U.S. Application Data (60) Provisional application No. 62/742,130, filed on Oct. 5, 2018.

(51) Int. Cl.
*G01N 30/30*    (2006.01)
*G01N 30/46*    (2006.01)
*G01N 30/62*    (2006.01)

(52) U.S. Cl.
CPC ....... *G01N 30/30* (2013.01); *G01N 2030/303* (2013.01); *G01N 30/465* (2013.01); *G01N 2030/623* (2013.01)

(58) Field of Classification Search
CPC ............. G01N 30/30; G01N 2030/303; G01N 2030/623
See application file for complete search history.

(56) References Cited

U.S. PATENT DOCUMENTS

| | | | |
|---|---|---|---|
| 8,226,825 B2 | 7/2012 | Ross | |
| 8,277,544 B2 | 10/2012 | Guan et al. | |
| 11,073,502 B2 * | 7/2021 | Stallone | G01N 30/30 |
| 2008/0280285 A1 | 11/2008 | Chen et al. | |

(Continued)

FOREIGN PATENT DOCUMENTS

WO    WO-2017173447 A1    10/2017

OTHER PUBLICATIONS

German Patent and Trademark Office, Office Action for Application No. 112019005004.4 dated Sep. 16, 2022.

(Continued)

*Primary Examiner* — Helen C Kwok
(74) *Attorney, Agent, or Firm* — Honigman LLP (57) ABSTRACT

A thermal modulator for a chromatographic system includes a cooler, a thermal valve, a thermal buffer, a heater, and a capillary. The thermal valve thermally-engages the cooler. The thermal buffer thermally-engages the thermal valve. The heater thermally-engages the thermal buffer. The capillary thermally-engages the heater and is configured to transport an analyte in a first direction.

17 Claims, 10 Drawing Sheets

(56) References Cited

U.S. PATENT DOCUMENTS

| | | | |
|---|---|---|---|
| 2011/0088452 A1* | 4/2011 | Kim | G01N 30/463 |
| | | | 73/23.42 |
| 2011/0232366 A1* | 9/2011 | Guan | G01N 30/465 |
| | | | 73/23.42 |
| 2012/0011921 A1 | 1/2012 | Broeckhoven et al. | |
| 2020/0041466 A1* | 2/2020 | Merrick | G01N 30/46 |
| 2020/0072801 A1* | 3/2020 | Stallone | G01N 30/30 |
| 2021/0003539 A1* | 1/2021 | Carson | G01N 30/12 |
| 2021/0356441 A1* | 11/2021 | Stallone | G01N 30/30 |

OTHER PUBLICATIONS

International Search Report dated Jan. 21, 2020, relating to International Application No. PCT/US2019/054618.

Japanese Patent Office, Final Office Action for Application 2021-514410 dated Mar. 2, 2023 (English translation attached).

* cited by examiner

THERMAL MODULATOR

TECHNICAL FIELD

This disclosure relates to a thermal modulator, and to a device for thermally modulating analytes within a capillary in a chromatographic system.

BACKGROUND

Fast heating combined with low temperatures for trapping have been acknowledged as desirable for narrow reinjection in chromatography systems. Fast heating has been achieved by, for example, hot gas jets, movement of the trapped zone into the hot zone of a hot air bath, resistive heating of metal capillary columns, metal coated fused silica columns, or small diameter metal tubing through which a capillary column is passed, among other things.

Systems using liquid nitrogen for cooling are sought for high performance in that they can reach cryogenic temperatures, but operating expenses associated with such systems are high and can be commercially impractical in many contexts.

SUMMARY

One aspect of the present disclosure provides a thermal modulator for a chromatographic system. The thermal modulator includes a cooler, a thermal valve, a thermal buffer, a heater, and a capillary. The thermal valve thermally-engages the cooler. The thermal buffer thermally-engages the thermal valve. The heater thermally-engages the thermal buffer. The capillary thermally-engages the heater and is configured to transport an analyte in a first direction.

This aspect of the disclosure may include one or more of the following features. In some implementations, the thermal valve includes an anisotropic material operable to transfer heat at a first rate in the first direction and at a second rate in a second direction transverse to the first direction. The anisotropic material may be operable to transfer heat at the first rate in a third direction transverse to the first direction and the second direction. The first rate may be greater than the second rate.

In some implementations, the first cooler is thermoelectric.

In some implementations, the thermal modulator includes a second thermoelectric cooler thermally-engaging the thermal valve. The thermal valve may be disposed between the first cooler and the second cooler. The heater may thermally-engage the first cooler.

In some implementations, the thermal buffer surrounds the heater.

In some implementations, the thermal modulator includes a cold reservoir disposed between, and thermally-engaging, the thermal valve and the first thermoelectric cooler.

According to another aspect, the present disclosure provides a thermal modulator for a chromatographic system. The thermal modulator includes a thermoelectric cooler, a cold reservoir, a thermal buffer, a heater, and a capillary. The cold reservoir thermally-engages the thermoelectric cooler. The thermal buffer thermally-engages the cold reservoir. The heater thermally-engages the thermal buffer. The capillary thermally-engages the heater and is configured to transport an analyte in a first direction.

This aspect of the disclosure may include one or more of the following features. In some implementations, an anisotropic material is disposed between, and thermally-engages, the thermal buffer and the cold reservoir. The anisotropic material may be operable to transfer heat at a first rate in the first direction and at a second rate in a second direction transverse to the first direction. The anisotropic material may be operable to transfer heat at the first rate in a third direction transverse to the first direction and the second direction. The first rate may be greater than the second rate.

In some implementations, the first cooler is thermoelectric.

In some implementations, the thermal modulator includes second thermoelectric cooler thermally-engaging the cold reservoir. The cold reservoir may be disposed between the first thermoelectric cooler and the second thermoelectric cooler.

In some implementations, the heater thermally-engages the first thermoelectric cooler.

In some implementations, the thermal buffer surrounds the heater.

Another aspect of the present disclosure provides a chromatographic system having a thermal modulator. In some implementations, the thermal modulator includes a thermoelectric modulator comprising a thermally anisotropic material disposed on a surface of the thermal modulator. The anisotropic material may have a thermal conductivity in a plane that is greater than a thermal conductivity in a direction transverse to the plane. Accordingly, heat may be distributed over (e.g., tangential to) the entire surface of the thermal modulator rather than conducting directly into (e.g., transverse to) the thermal modulator at a heating location and raising the temperature significantly more in a restricted region under a heater capillary assembly. In distributing heat over the entire surface, a cold reservoir of the thermal modulator is efficiently (e.g., completely or more than 90%) utilized and to remove the heat the entire source of cooling is utilized.

In some implementations, a cold reservoir is disposed over a ceramic cover of the source of cooling. The cold reservoir may be formed of a metal material. In some implementations, the cold reservoir is disposed under the anisotropic material (e.g., sandwiched between the source of cooling and the anisotropic material) to act as a thermal reservoir. The local temperature within the heat sink may rise before the heat is removed by the source of cooling over a longer time.

In some implementations, the thermal modulator may include a thermal buffer to contain the heat during heating.

If a trapping temperature is raised (e.g., as a gas chromatography oven temperature is ramped), the thermal modulator may control the trapping temperature by heating a cold tip/thermal buffer/heater/capillary assembly with an auxiliary heater with a specific material disposed between this assembly and the source of cooling. For example, a thermal valve material may be disposed between the ceramic surface of the thermoelectric cooler and the anisotropic material or metal cold reservoir, if used. The auxiliary heater may raise the temperature in the vicinity of the capillary. In one implementation, the heater may be the capillary heater operating at a low duty cycle. In another implementation, the heater may be a separate heater positioned around the thermal buffer/heater/capillary assembly. As the temperature is raised on the thermal buffer/heater/capillary assembly, the heat flow to the source of cooling may be restricted by the material of the thermal valve.

In some implementations, the material of the thermal valve is a material which has a low thermal conductivity at higher temperatures and a high thermal conductivity at lower temperatures, such as sapphire, for example. Alternatively, the thermal valve material could be an insulator, such as polyimide which restricts the flow of heat such that the source of cooling stays within its desired range of operation. In the former case (e.g., sapphire or the like) the material tends to provide a more constant flow of heat even as the temperature differential increases between the trapping temperature and the cooling source. In the latter case (e.g., an insulator or its equivalent) the material provides sufficient restriction to contain the heat in the cold tip and to restrict heat flow to the cooling source from becoming excessive to the point that the amount of heat exceeds the capability of the cooling source to remove it. In each case the thickness of the material may be optimized so that the heat flow at a maximum trapping temperature would be handled by the cooling source. Accordingly, the cooling source may not exceed its maximum operating temperature and it may return sufficiently fast to a starting temperature when the system cycles back to the initial operating conditions at the beginning of the next analysis.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

This disclosure describes an exemplary system having a device for modulating analytes in a chromatograph. This disclosure will describe a system in which such a device is employed in a comprehensive two-dimensional gas chromatography system ("GC×GC"), and where the device is utilized as a thermal modulator for the system. The described GC×GC system is included to provide an exemplary environment in which the device may be employed, but the device is not intended to be limited to such a system. For example, and among others, the device may be utilized (i) between columns in a chromatographic system or (ii) to introduce a sample before a first column, as well. It will also be understood that the device may be utilized in systems other than gas chromatographs.

In some implementations, a two-dimensional gas chromatography system includes a device configured as a thermal modulator to provide sufficiently narrow reinjection bands, at high frequencies, for quick modulation and optimum comprehensive two-dimensional gas chromatography. As described herein, efficient thermal control can yield sufficiently narrow bands, with fast modulation. In some implementations, the device is configured to accomplish a steep thermal gradient at a trapping portion of a capillary that extends through the device while minimizing the thermal load at a cooling device. For example, a trapping portion of the capillary is heated and cooled such that analytes in the trapping zone of the capillary are desorbed and/or passed through the capillary (while heated) and trapped and/or focused (while cooled).

In implementations, and as described herein, the device provides an efficient way to obtain the desired, and alternating, temperatures in a capillary.

Figure 1A:
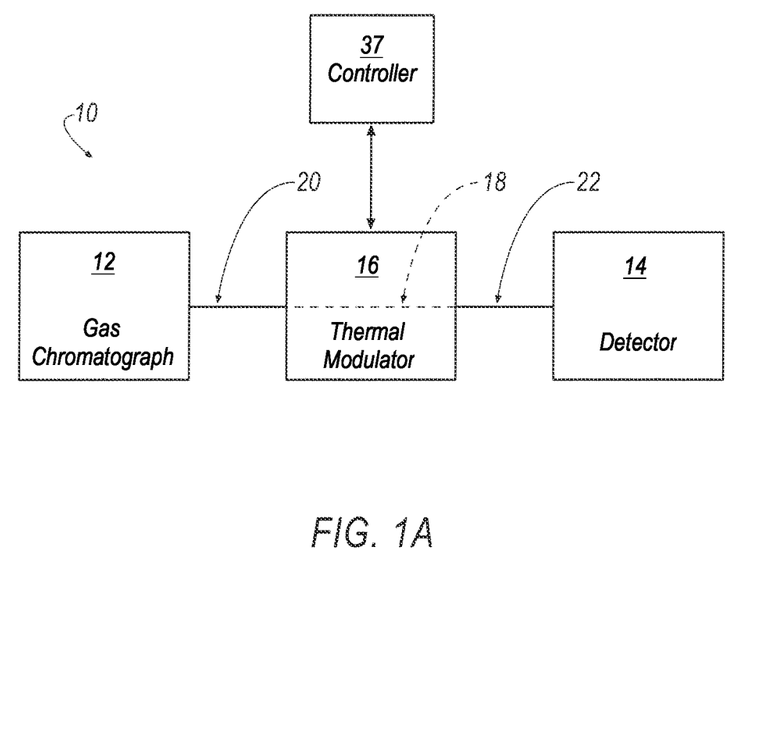
FIG. 1A is a schematic view of an example of a chromatographic system, utilizing a device in accordance with the principles of the present disclosure.

Now, with reference to the figures, FIG. 1A illustrates a portion of a chromatographic system 10 that employs a gas chromatograph 12, a detector 14, and a device 16 between gas chromatograph 12 and detector 14. As described above, device 16 may be a thermal modulator; and, in the exemplary system 10 hereafter described device 16 will be used as a thermal modulator. So for the remainder of this disclosure, device 16 may be referenced as thermal modulator 16 or device, yet the disclosure is not limited to a thermal modulator in such a system 10.

In some implementations, a capillary 18 is provided between gas chromatograph 12 and detector 14. The capillary 18 may extend through thermal modulator 16 as shown in FIGS. 1A, 1B, and 1C.

In some implementations, a sample (not shown) is transferred through capillary 18 from the gas chromatograph 12 to thermal modulator 16 via an input portion 20 of capillary 18. After passing through modulator 16, the sample may be further transferred from thermal modulator 16 to detector 14 (or other external gas chromatographic detectors, columns, or the like (not shown)) through an output portion 22 of capillary 18. While a single capillary is described, it is to be understood that more than one capillary 18, transfer line, and other means for passing samples into, and out of, the modulator 16 may be utilized. For example, and without limitation, a second column may be introduced.

Figure 3:
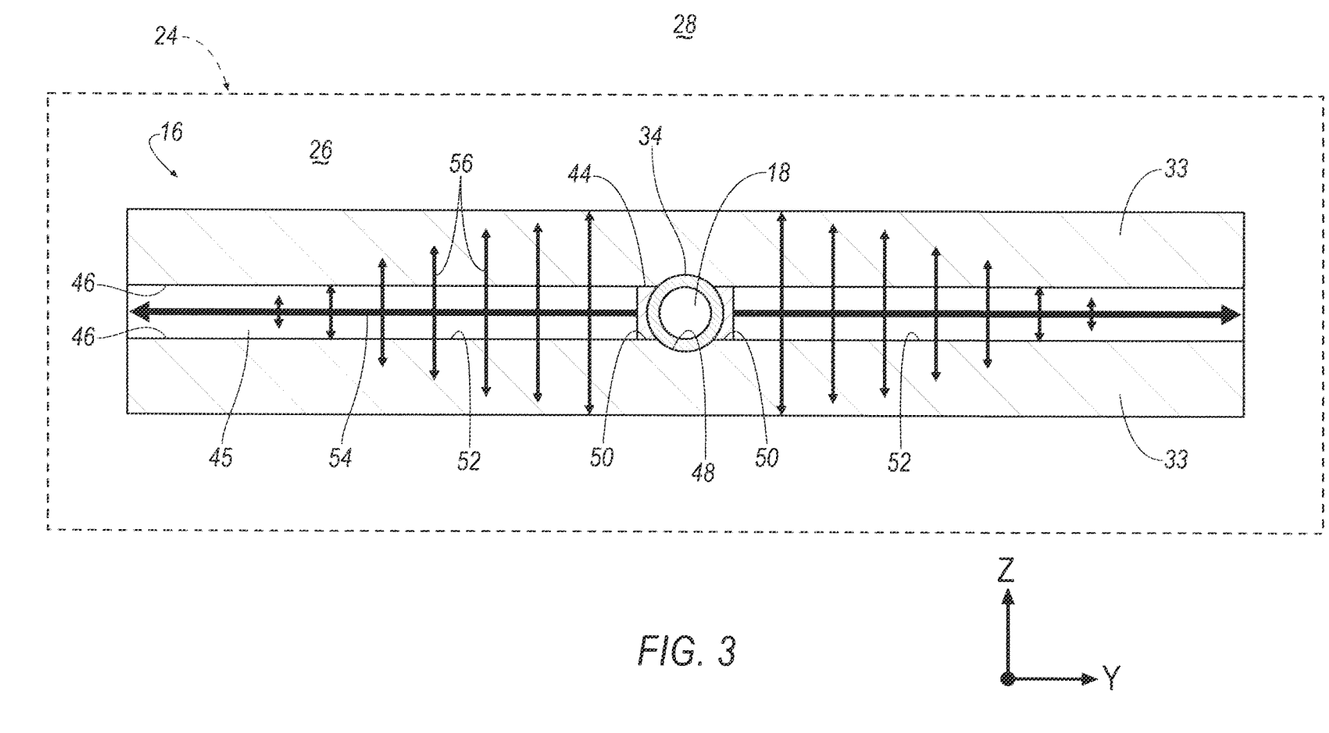
FIG. 3 is a cross-sectional view of an example thermal modulator device for the system of FIGS. 1A-1C, taken along a line extending across 3 to 3 of FIG. 2.

With reference to FIG. 3, in some implementations, device 16 includes a chamber 24 defining an internal portion 26 and an external portion 28. Capillary 18 is disposed within internal portion 26 of chamber 24. As illustrated in FIG. 1A, capillary 18 includes input 20, output 22, and an elongate body that extends between input 20 and output 22. In an implementation, chamber 24 may be an oven. Other implementations include an ambient controlled temperature chamber, or simply an enclosed space.

Figure 1B:
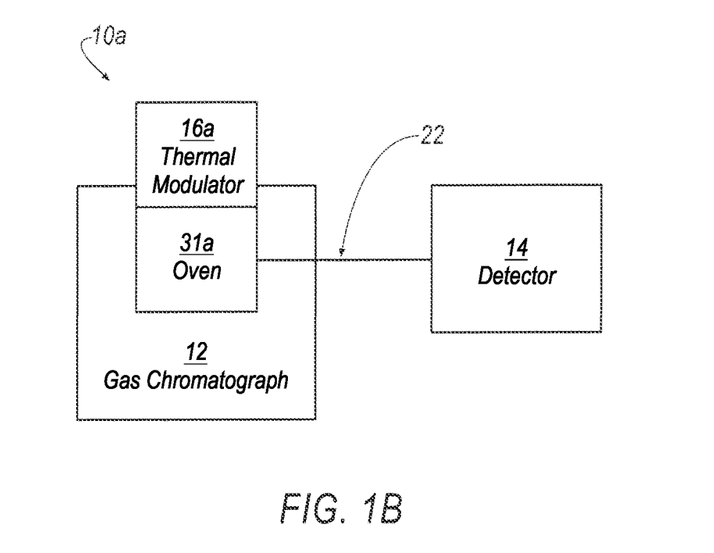
FIG. 1B is a schematic view of another example of a chromatographic system, utilizing a device in accordance with the principles of the present disclosure.
Figure 1C:
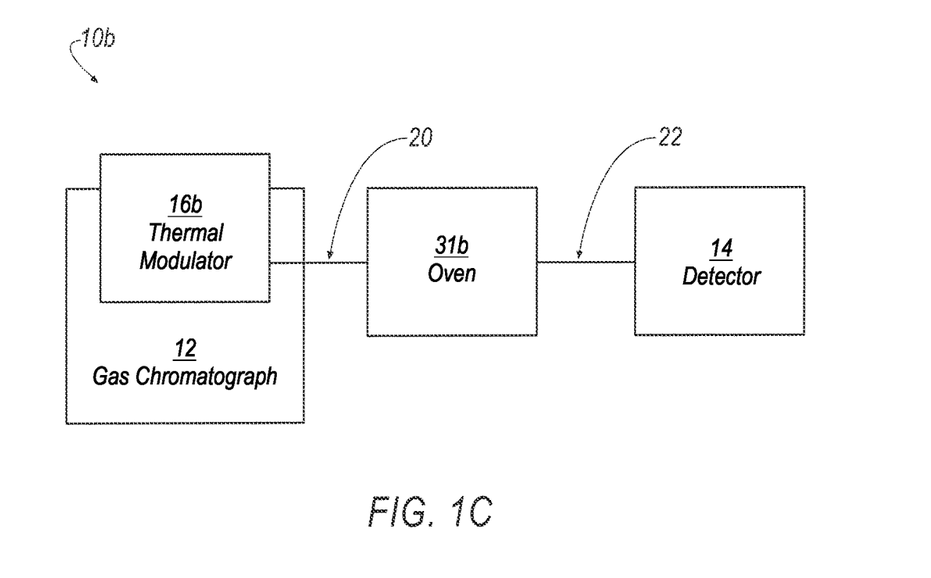
FIG. 1C is a schematic view of another example of a chromatographic system, utilizing a device in accordance with the principles of the present disclosure.

With reference to FIGS. 1B and 1C, other implementations of a chromatographic system 10a, 10b, respectively, are shown. The chromatographic systems 10*a*, 10*b* may be substantially similar to the chromatographic system 10, except as otherwise provided herein. Accordingly, like reference numerals are used hereinafter and in the drawings to identify like components, while like reference numerals containing letter extensions (i.e., "a" and "b," respectively) are used to identify those components that have been modified. As illustrated in FIG. 1B, the chromatographic system 10*a* may include an oven 31*a* and a device 16*a*. The oven 31*a* may be adjacent to, and discretely formed relative to, the device 16*a*. The oven 31*a* and device 16*a* may be disposed within the gas chromatograph 12. As illustrated in FIG. 1C, the chromatographic system 10*b* may include an oven 31*b* and a device 16*b*. The oven 31*b* may be adjacent to, and discretely formed relative to, the device 16*b*. The device 16*b* may be disposed within the gas chromatograph 12, and the oven 31*b* may be disposed external to the gas chromatograph 12.

Figure 10:
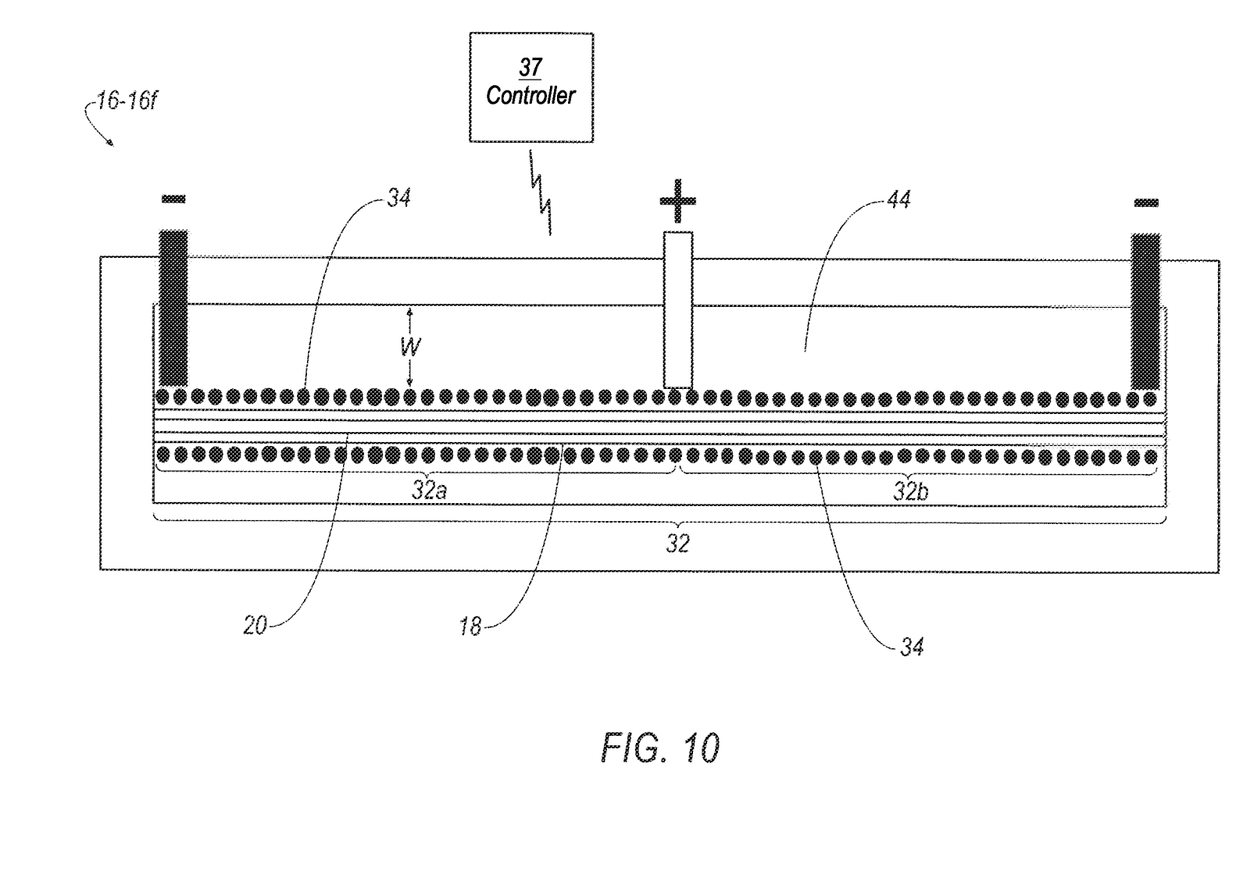
FIG. 10 is a schematic perspective view of an example of a thermal buffer disposed in an example of a heat exchange block of an exemplary device for the system of FIGS. 1A-1C.

In some implementations, device 16 is provided to control the temperature of a portion of capillary 18 in an efficient manner. For example, as illustrated in FIG. 10, device 16 is situated to control the temperature of at least one trapping zone 32 of capillary 18. The illustrated system 10 includes a two-stage modulation whereby device 16 may control the temperature of two trapping zones 32*a*, 32*b* of capillary 18. As previously described, it may be desired to alternate the trapping zone 32 between a first, cooled (or trapping) temperature and a second, heated (or desorption) temperature to control a flow characteristic of the analytes within trapping zone 32 of capillary 18.

Device 16 acts as a thermal modulation device to efficiently heat and cool trapping zone 32 of the capillary 18 and to manage the load experienced by a cooling device situated against device 16. The configurations described below introduce variants of different materials, structures and schemas fashioned with the dual purpose to selectively: (i) during a first time frame: (a) raise the heat about trapping zone 32 quickly, (b) retain the heat within the trapping zone 32, and (c) minimize the draw of heat from trapping zone 32; and (ii) during a second time frame: remove heat from the trapping zone 32 and direct same toward a cooling device.

In some implementations, and in various configurations and combinations, this heating and cooling of trapping zone 32 of capillary 18 can be effected by one or more of: (i) a cooling device 33, such as a heat sink, for example, that is situated external to chamber 24, (ii) a heater 34 that is situated inside chamber 24, or more proximate to capillary 18 relative to cooling device 33, (iii) a thermal buffer 44 that may be situated, in one form or another, between cooling device 33 and heater 34, (iv) one or more thermal valves 45 that may be situated, in one form or another, between opposed cooling device 33, and (v) a combination of any number of the items (i)-(iv). Examples of the foregoing arrangements, and combinations thereof, will be described in more detail below.

As illustrated in FIG. 1A, in some implementations, a controller 37 is provided to selectively alternate trapping zone 32 between (i) a cooling temperature by turning off the heat and using cooling device 33, and (ii) an injection temperature using heater 34. The controller 37 may control the heater 34 to alternate between an ON state and an OFF state at a user defined interval.

Figure 4:
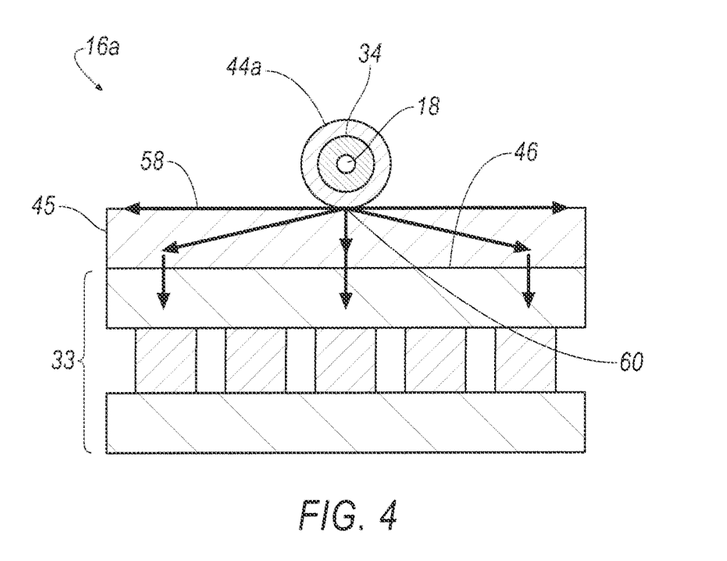
FIG. 4 is a cross-sectional view of another example thermal modulator device for the system of FIGS. 1A-1C, taken along a line extending across 3 to 3 of FIG. 2.
Figure 5:
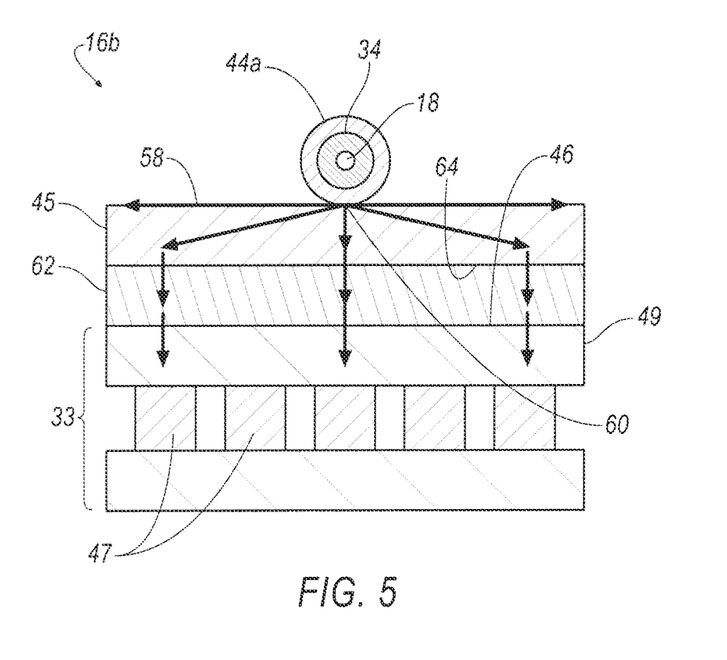
FIG. 5 is a cross-sectional view of another example thermal modulator device for the system of FIGS. 1A-1C, taken along a line extending across 3 to 3 of FIG. 2.

As illustrated in FIG. 3, in some implementations, the device 16 includes two cooling devices 33 to provide trapping temperatures. In some implementations, the cooling device 33 includes a thermoelectric cooling device. In this regard, as illustrated in FIGS. 4 and 5, the cooling device 33 may include a plurality of electrical elements 47 configured to provide the cooling and overlaid by an electrically insulating ceramic 49 (e.g., alumina or aluminum nitride). It will be appreciated, however, that the cooling device 33 may include any other type of cooler including cryogenic coolers or passive coolers within the scope of the present disclosure. It will also be appreciated that the cooling device 33 may also be applied to high speed GC injection systems, controlled temperature injections, and a multiple distillation injection device for GC. For example, the cooling device 33 may be utilized with any GC injection device requiring cold trapping and hot desorption including high speed GC injection, injection at a controlled temperature, and a multiple distillation device coupled to a gas chromatograph.

Figure 2:
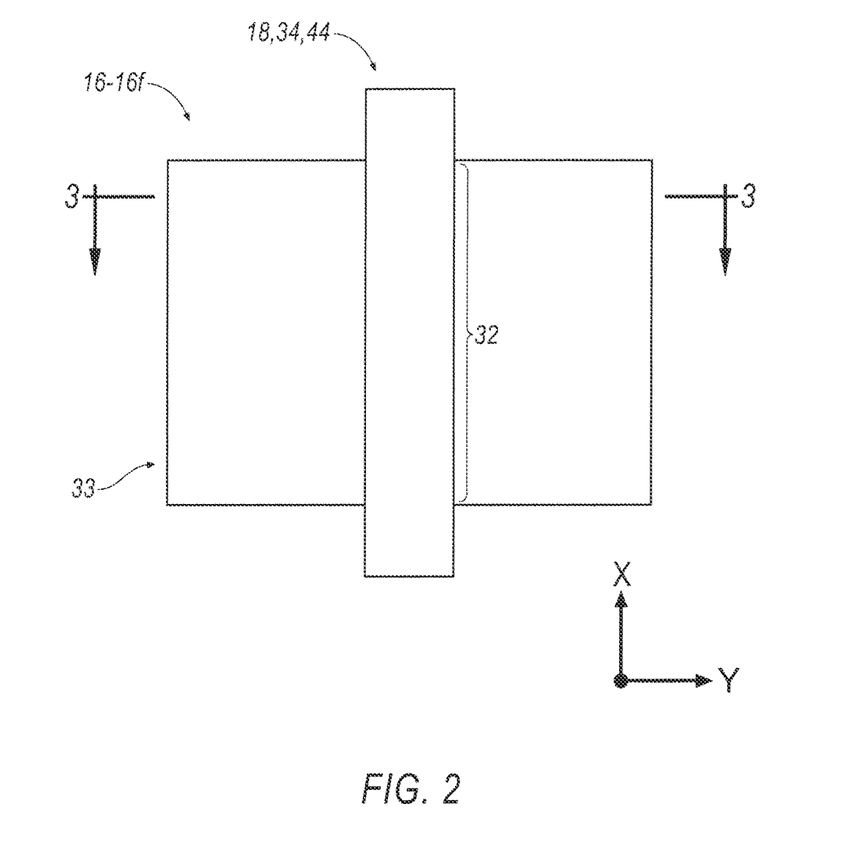
FIG. 2 is a schematic plan view of an example thermal modulator device for the system of FIGS. 1A-1C.

As illustrated in FIGS. 2 and 3, the thermal buffer 44 may be in thermal engagement with the thermal valves 45, the heater 34, and the cooling device 33. In particular, each cooling device 33 may be in thermal engagement with the thermal buffer 44 at the trapping zone 32 of the capillary 18. In this regard, the cooling device 33 may include a surface 46 having contact areas 48, 50, 52. Contact area 48 may thermally engage the heater 34. Contact areas 50 may thermally engage the thermal buffer 44. One or more contact areas 52 may thermally engage the thermal valve 45. As illustrated, the contact area 48 may be disposed between a pair of contact areas 50, and the contact areas 50 may be disposed between a pair of contact areas 52.

With reference to FIG. 4, another implementation of a device 16*a* is shown. The device 16*a* may be substantially similar to the device 16, except as otherwise shown or described herein. Accordingly, like reference numerals are used hereinafter and in the drawings to identify like components, while like reference numerals containing letter extensions (i.e., "a") are used to identify those components that have been modified. The device 16*a* may include a thermal buffer 44*a*. As illustrated in FIG. 4, the thermal buffer 44*a* may surround the heater 34 such that an outer surface of the thermal buffer 44*a* thermally engages a surface 58 of the thermal valve 45 at a contact area 60.

With reference to FIG. 5, another implementation of a device 16*b* is shown. The device 16*b* may be substantially similar to the device 16, 16*a* except as otherwise shown or described herein. Accordingly, like reference numerals are used hereinafter and in the drawings to identify like components, while like reference numerals containing letter extensions (i.e., "b") are used to identify those components that have been modified. The device 16*a* may include a cold reservoir 62 situated, in one form or another, between the cooling device 33 and the thermal valve 45. In particular, as illustrated in FIG. 5, the cold reservoir 62 may thermally engage the surface 46 of the cooling device 33 and a surface 64 of the thermal valve 45.

Figure 6:
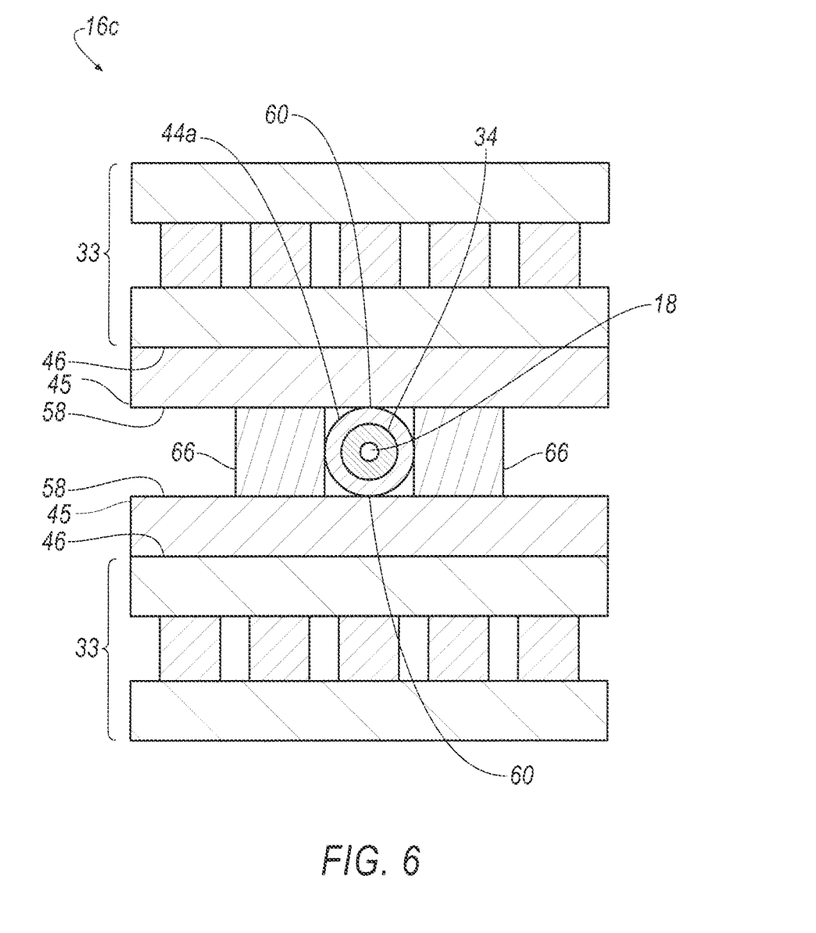
FIG. 6 is a cross-sectional view of another example thermal modulator device for the system of FIGS. 1A-1C, taken along a line extending across 3 to 3 of FIG. 2.

With reference to FIG. 6, another implementation of a device 16*c* is shown. The device 16*c* may be substantially similar to the device 16, 16*a*, 16*b* except as otherwise shown or described herein. Accordingly, like reference numerals are used hereinafter and in the drawings to identify like components, while like reference numerals containing letter extensions (i.e., "c") are used to identify those components that have been modified. The device 16*c* may include one or more secondary thermal buffers 66 situated, in one form or another, between a pair of cooling devices 33 and adjacent the thermal buffer 44. In some implementations, the device 16*c* includes a pair of secondary thermal buffers 66 such that the capillary 18, heater 34, and thermal buffer 44 are disposed between the pair of secondary thermal buffers 66.

As illustrated in FIG. 6, the thermal buffers 66 may thermally engage the surfaces 58 of the opposed cooling devices 33.

Figure 7:
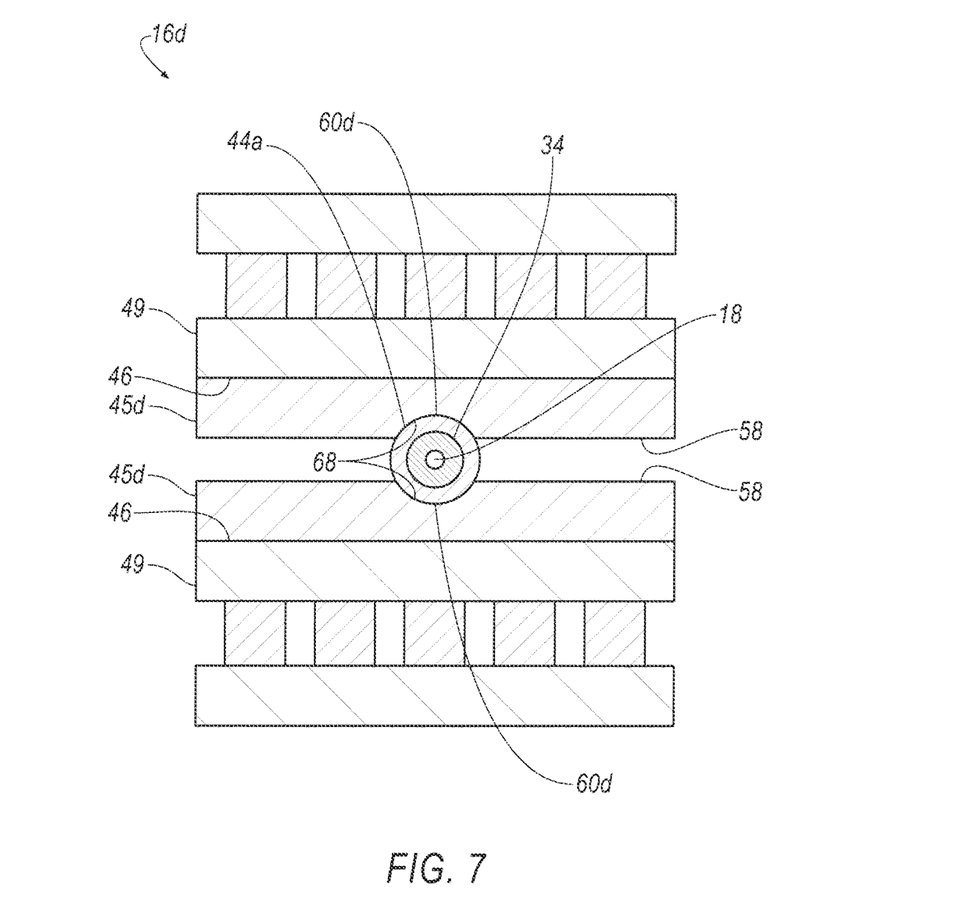
FIG. 7 is a cross-sectional view of another example thermal modulator device for the system of FIGS. 1A-1C, taken along a line extending across 3 to 3 of FIG. 2.

With reference to FIG. 7, another implementation of a device 16d is shown. The device 16d may be substantially similar to the device 16, 16a, 16b, 16c except as otherwise shown or described herein. Accordingly, like reference numerals are used hereinafter and in the drawings to identify like components, while like reference numerals containing letter extensions (i.e., "d") are used to identify those components that have been modified. The device 16d may include one or more thermal valves 45d that may be situated, in one form or another, between opposed cooling device 33 and adjacent the thermal buffer 44. In some implementations, the device 16d includes a pair of thermal valves 45d. The thermal valves 45d may be substantially similar to the thermal valves 45, except as otherwise shown or described herein. In this regard, the surface 58 of the thermal valves 45d may include a concavity 68. The thermal buffer 44a may be disposed within the concavity 68 such that the thermal valves 45d thermally-engage an outer surface of the thermal buffer 44a at a concave contact area 60d.

Figure 8:
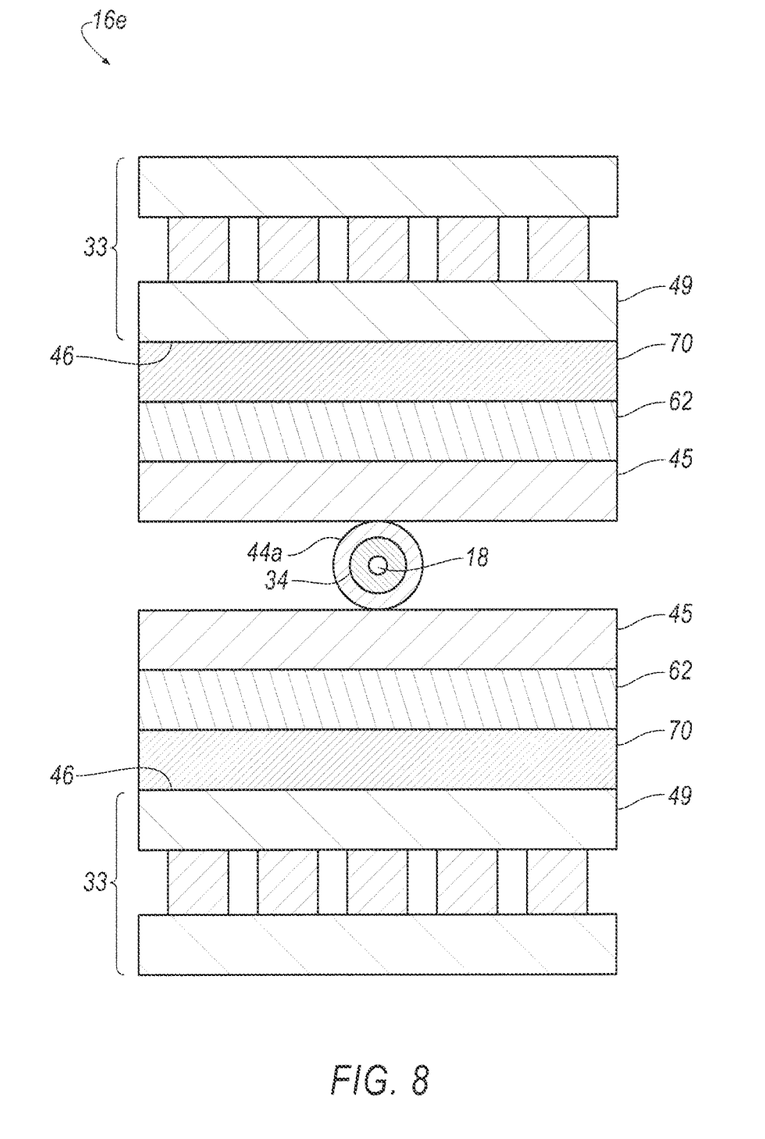
FIG. 8 is a cross-sectional view of another example thermal modulator device for the system of FIGS. 1A-1C, taken along a line extending across 3 to 3 of FIG. 2.

With reference to FIG. 8, another implementation of a device 16e is shown. The device 16e may be substantially similar to the device 16, 16a, 16b, 16c, 16d except as otherwise shown or described herein. Accordingly, like reference numerals are used hereinafter and in the drawings to identify like components, while like reference numerals containing letter extensions (i.e., "e") are used to identify those components that have been modified. The device 16e may include one or more secondary thermal valves 70 (e.g., thermal controllers) that may be situated, in one form or another, between the cooling device 33 and the cold reservoir 62. In some implementations, the device 16e includes a pair of secondary thermal valves 70, such that a first of the secondary thermal valves 70 thermally-engages a first of the cold reservoirs 62 and the outer surface 46 of a first device 33, and a second of the secondary thermal valves 70 thermally-engages a second of the cold reservoirs 62 and the outer surface 46 of a second device 33. As described above, in some implementations, the secondary thermal valves 70 may include, or be formed, at least in part from, a material having a low thermal conductivity at higher temperatures and a high thermal conductivity at lower temperatures (e.g., sapphire or the like). Alternatively, the secondary thermal valves 70 may be formed, at least in part, from insulating material, such as polyimide which restricts the flow of heat. Accordingly, thermal valve controls the heat from the "cold tip" (region where the heat is generated and controlled) to the cooler. In the case of the transient heating for desorption, this heat is removed through the thermal valve to the cooler and the thermal valve controls how much heat flows to the cooler as the trapping temperature is controlled in the cold tip.

Figure 9:
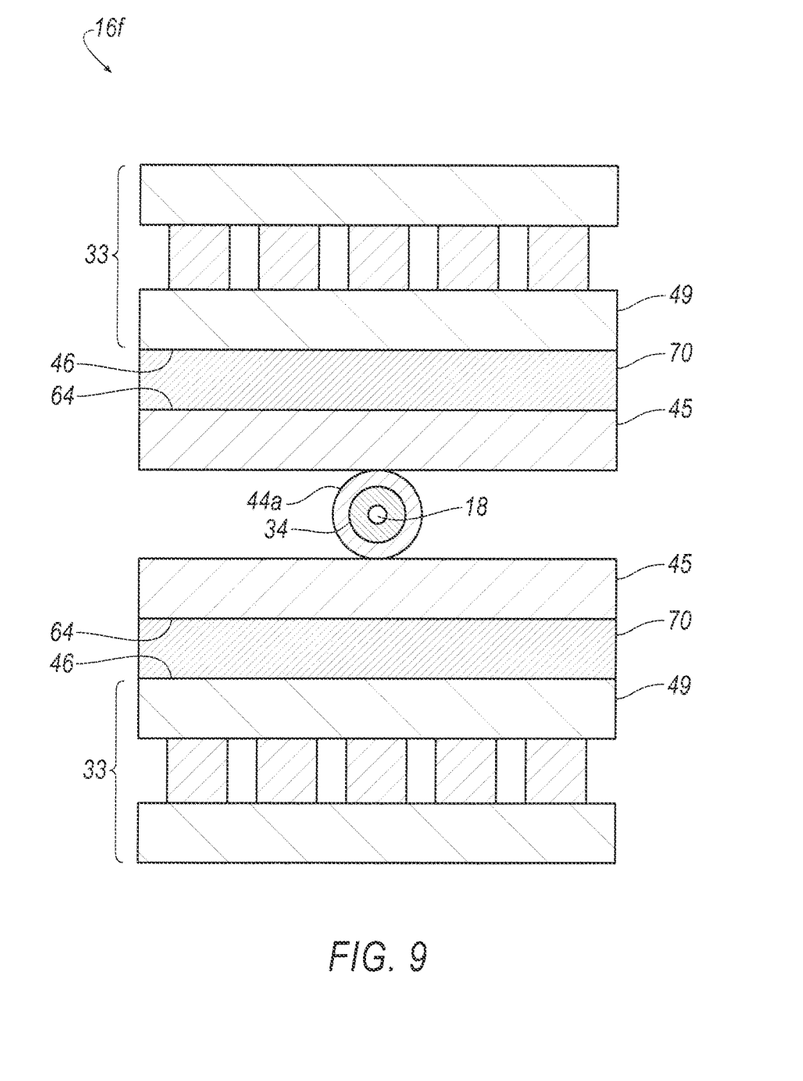
FIG. 9 is a cross-sectional view of another example thermal modulator device for the system of FIGS. 1A-1C, taken along a line extending across 3 to 3 of FIG. 2.

With reference to FIG. 9, another implementation of a device 16f is shown. The device 16f may be substantially similar to the device 16, 16a, 16b, 16c, 16d, 16e except as otherwise shown or described herein. Accordingly, like reference numerals are used hereinafter and in the drawings to identify like components, while like reference numerals containing letter extensions (i.e., "f") are used to identify those components that have been modified. The device 16f may include one or more secondary thermal valves 70 that may be situated, in one form or another, between the cooling device 33 and the thermal valve 45. In some implementations, the device 16f includes a pair of secondary thermal valves 70, such that a first of the secondary thermal valves 70 thermally-engages the outer surface 46 of a first device 33 and the surface 64 of a first thermal valve 45, and a second of the secondary thermal valves 70 thermally-engages the outer surface 46 of a second device 33 and the surface 64 of a second thermal valve 45.

In some implementations, the thermal valve(s) 45 includes, or is formed from, a thermally anisotropic material. For example, in some implementations, the thermal valve 45 includes, or is otherwise formed at least in part from, pyrolytic graphite. In some implementations, the thermal valve 45 or the cold reservoir 62 includes, or is otherwise formed at least in part from, a metal material (e.g., copper). In particular, the thermal valves 45 may be formed from a material having a thermal conductivity 54 in the x-y plane that is higher than a thermal conductivity 56 in the z-direction, such that heat is distributed over the entire surface 46 rather than conducted directly into (e.g., in the z-direction) the cooling device 33 at the contact area 48. Accordingly, in distributing the heat over the surface 46, and removing heat with the cooling device 33, the cold reservoir of the entire cooling device 33 may be utilized, such that a temperature rise of electrical elements immediately below (e.g., in the z-direction) the heater 34 may be less than a temperature rise if the thermal valve had not been used. This distribution of heat is achieved by the high thermal conductivity 54 in the x-y plane of the thermal valve 45 and the low thermal conductivity 56 in the z-direction.

During operation, the thermal valve 45 can absorb heat from the desorption process, spread it across the surface 46 and then, over a longer period of time, but before the next desorption, the heat in the thermal valve 45 can transfer through the surface 46 to the cooling elements of the cooling device 33. The thickness of the thermal valve 45 and the cold reservoir 62 may be optimized depending on the heat flow characteristics (e.g., temperature differences, materials and dimensions) of the system. For example, the thickness (e.g., in the y-direction) of the thermal valve 45 and the cold reservoir 62 may be optimized to allow the heat to be distributed over the surface 46 before it significantly distributes into the surface 46 of the cooling device 33.

In some implementations, device 16, 16a, 16b is configured in such a manner, and as described in specificity herein, whereby capillary 18 is heated to a desorption temperature at a predetermined rate or during a first predetermined amount of time (T1) and cooled at a predetermined rate or during a second predetermined amount of time (T2). For example, in some implementations, the first predetermined amount of time (T1) may be substantially at or between 0.5 ms and 20 ms and in another implementation the time (T1) may be substantially at or between 3 ms and 10 ms. In some implementations, the second predetermined amount of time (T2) may be at or between 20 ms and 200 ms.

In some implementations, heating to a desorption temperature at a predetermined rate or during a first predetermined amount of time (T1) may include applying a high current pulse (e.g., 3-12 ampere capacitive discharge) to the heater 34. In some implementations, heater 34 is maintained at a predetermined temperature for a third predetermined amount of time (T3). In some implementations, a third period of time (T3) may optionally be introduced to clear the trap between the first and second predetermined amounts of time. In an implementation, the third period of time (T3) may be substantially at or between 10 ms and 30 ms. An application of a low current pulse (e.g., 1-5 ampere auxiliary discharge) may be provided to the heater 34, to facilitate the trap clearing process.

In some implementations, cooling device 33 provides sufficient cooling power and a low cooling power density. In particular, the thermal valve 45 or the cold reservoir 62 provides a cooling system that is able to quickly and efficiently remove the concentrated heat of the small area of the thermal buffer 44 and heater 34 produced when heater 34 is ON. This is achieved by the thermal valve 45 or the cold reservoir 62 efficiently spreading the heat from the small area of the thermal buffer 44 and heater 34 to the significantly larger surface area of the cooling device 33, thus efficiently utilizing the total cooling power of the cooling device 33 on the required time scale (e.g., during a predetermined period of time).

While the thermal buffer 44 is shown as two discrete bodies in FIG. 3, the thermal buffer 44 may be combined as a single body and comprised of a single material as shown in FIGS. 4 and 5, and exhibit similar characteristics to the configurations shown in FIGS. 4 and 5.

A method for modulating analytes in a gaseous stream passing through a device (e.g., device 16, 16a, 16b) will now be described, where the analytes are retained in the device, or allowed to pass through the device, based on certain device conditions.

In an implementation, such a method comprises providing a capillary (e.g., capillary 18) that extends through a heating member (e.g., heater 34). The capillary and heating member may be disposed within (e.g., surrounded by) a thermal buffer (e.g., thermal buffer 44). The thermal buffer may include a material having a variable thermal conductivity such that the thermal conductivity thereof is higher at low temperatures and lower at high temperatures, or a thin film insulator, such as a polyimide. The method may also include heating the heater to a first temperature to desorb the analytes within the capillary to allow the analytes to pass through the capillary during a first time period. The method may further include turning off the heater and cooling the capillary to a second temperature that is sufficient to trap and focus the analytes in the capillary during a second time period. During the first time period, the thermal buffer holds back heat from the cooling device to heat the capillary quickly and to minimize a heat load to a cooling device (e.g., cooling device 33). During the second time period, a thermal valve (e.g., thermal valve 45) quickly removes and spreads the heat over the area (e.g., in the x-y plane) of the cooling device 33. Then, still during the second time period, the heat is transferred through the second thermal valve (e.g., thermal valve 70) to the full surface area (e.g., in the x-y plane) of the cooling device 33 to fully utilize the cooling power of the cooling device 33.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A thermal modulator for a chromatographic system, the thermal modulator comprising:
   a first cooler;
   a thermal valve thermally-engaging the first cooler, the thermal valve including an anisotropic material operable to transfer heat at a first rate in the first direction and at a second rate in a second direction transverse to the first direction;
   a thermal buffer thermally-engaging the thermal valve;
   a heater thermally-engaging the thermal buffer; and
   a capillary thermally-engaging the heater and configured to transport an analyte in a first direction.

2. The thermal modulator of claim 1, wherein the anisotropic material is operable to transfer heat at the first rate in a third direction transverse to the first direction and the second direction.

3. The thermal modulator of claim 2, wherein the first rate is greater than the second rate.

4. The thermal modulator of claim 1, wherein the first cooler is thermoelectric.

5. The thermal modulator of claim 1, further comprising a second cooler thermally-engaging the thermal valve.

6. The thermal modulator of claim 5, wherein the thermal valve is disposed between the first cooler and the second cooler.

7. The thermal modulator of claim 1, wherein the heater thermally-engages the first cooler.

8. The thermal modulator of claim 1, wherein the thermal buffer surrounds the heater.

9. The thermal modulator of claim 1, further comprising a cold reservoir disposed between, and thermally-engaging, the thermal valve and the first cooler.

10. A thermal modulator for a chromatographic system, the thermal modulator comprising:
    a first thermoelectric cooler;
    a cold reservoir thermally-engaging the first thermoelectric cooler;
    a thermal buffer thermally-engaging the cold reservoir;
    a heater thermally-engaging the thermal buffer;
    a capillary thermally-engaging the heater and configured to transport an analyte in a first direction; and
    an anisotropic material disposed between, and thermally-engaging, the thermal buffer and the cold reservoir.

11. The thermal modulator of claim 10, wherein the anisotropic material is operable to transfer heat at a first rate in the first direction and at a second rate in a second direction transverse to the first direction.

12. The thermal modulator of claim 11, wherein the anisotropic material is operable to transfer heat at the first rate in a third direction transverse to the first direction and the second direction.

13. The thermal modulator of claim 12, wherein the first rate is greater than the second rate.

14. The thermal modulator of claim 10, further comprising a second thermoelectric cooler thermally-engaging the cold reservoir.

15. The thermal modulator of claim 14, wherein the cold reservoir is disposed between the first thermoelectric cooler and the second thermoelectric cooler.

16. The thermal modulator of claim 10, wherein the heater thermally-engages the first thermoelectric cooler.

17. The thermal modulator of claim 10, wherein the thermal buffer surrounds the heater.

* * * * *